US012664283B2

(12) United States Patent
Davenport et al.

(10) Patent No.: US 12,664,283 B2
(45) Date of Patent: Jun. 23, 2026

(54) MANAGEMENT CONTROLLER RESOURCE USAGE BY A SECURITY PROCESSOR

(71) Applicant: HEWLETT PACKARD ENTERPRISE DEVELOPMENT LP, Spring, TX (US)

(72) Inventors: Chris Davenport, Houston, TX (US); George Edward Newman, Houston, TX (US); Joseph Wright, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 129 days.

(21) Appl. No.: 18/635,433

(22) Filed: Apr. 15, 2024

(65) Prior Publication Data

US 2025/0322073 A1    Oct. 16, 2025

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC ... G06F 21/575; G06F 2221/034; G06F 21/57
See application file for complete search history.

(56) References Cited

U.S. PATENT DOCUMENTS

| | | | | |
|---|---|---|---|---|
| 7,610,381 B2 * | 10/2009 | Cherkasova | ............ | H04L 65/61 |
| | | | | 709/224 |
| 10,146,527 B2 | 12/2018 | Olarig et al. | | |
| 10,972,449 B1 * | 4/2021 | Levin | .................... | G06F 21/606 |
| 2008/0126492 A1 * | 5/2008 | Guidi | .................... | H04L 43/103 |
| | | | | 709/206 |
| 2022/0405171 A1 * | 12/2022 | Shelke | ................ | G06F 11/1433 |
| 2023/0034526 A1 * | 2/2023 | Cho | .................... | G06F 11/0772 |
| 2023/0297680 A1 * | 9/2023 | Bose | .................... | G06F 21/572 |
| | | | | 726/22 |

OTHER PUBLICATIONS

Supermicro, "Supermicro Server Management: BMC Firmware Security", May 2022 (9 pages).

* cited by examiner

*Primary Examiner* — Quazi Farooqui
(74) *Attorney, Agent, or Firm* — Trop, Pruner & Hu, P.C.

(57) ABSTRACT

In some examples, an electronic device includes a host processor, a security processor separate from the host processor, and a management controller separate from the host processor. The security processor loads agent instructions associated with the security processor to the management controller, and sends, from the security processor to the agent instructions executing on the management controller, an indication to execute identified machine-readable instructions. The agent instructions when executed on the management controller cause the management controller to, based on the indication, execute the identified machine-readable instructions that employ a resource of the management controller, and provide, from the management controller to the security processor, a result of a process that employs the resource of the management controller.

20 Claims, 4 Drawing Sheets

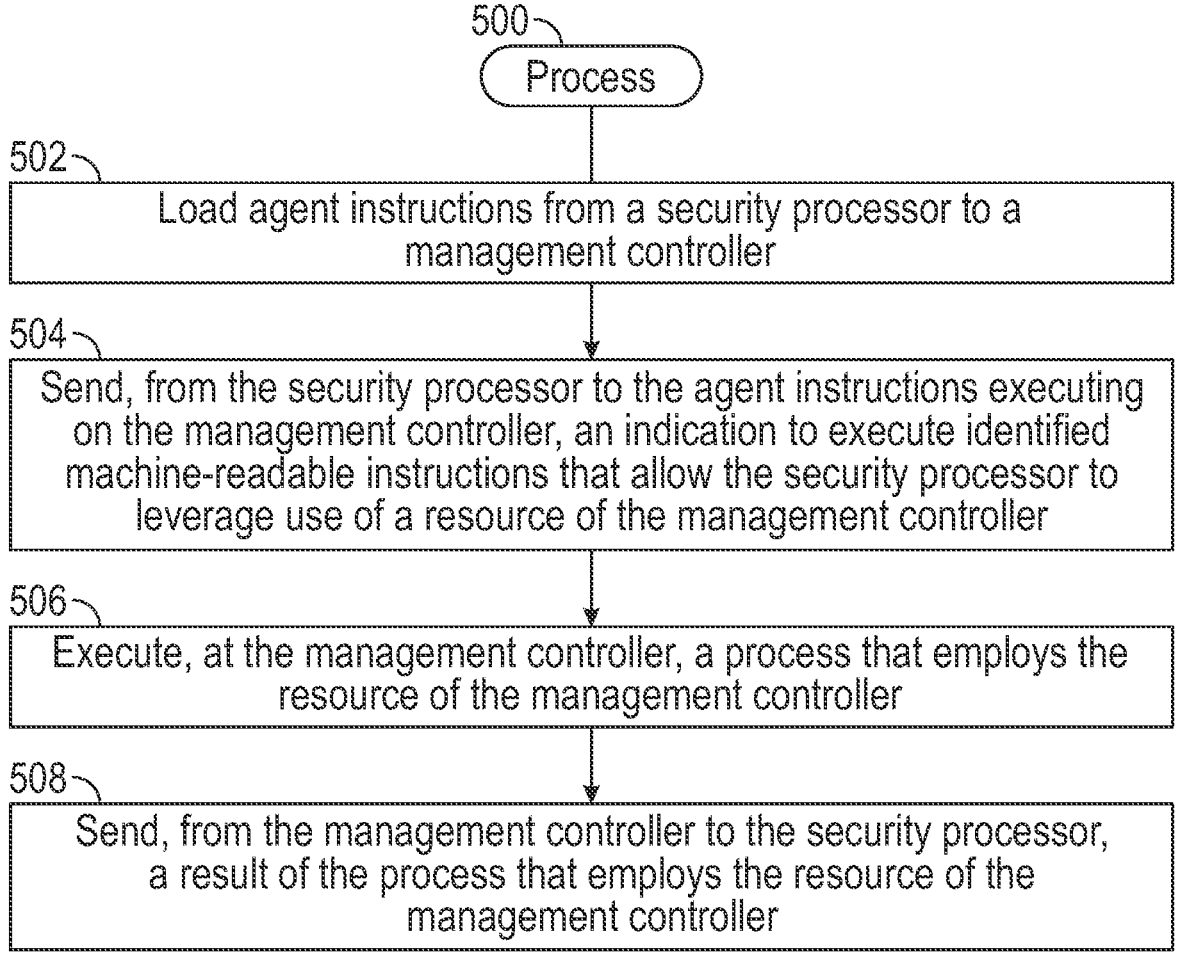

500

Process

502

Load agent instructions from a security processor to a
management controller

504

Send, from the security processor to the agent instructions executing
on the management controller, an indication to execute identified
machine-readable instructions that allow the security processor to
leverage use of a resource of the management controller

506

Execute, at the management controller, a process that employs the
resource of the management controller

508

Send, from the management controller to the security processor,
a result of the process that employs the resource of the
management controller

FIG. 5

MANAGEMENT CONTROLLER RESOURCE USAGE BY A SECURITY PROCESSOR

BACKGROUND

An electronic device can include a management controller to perform management tasks of the electronic device. The management controller can execute machine-readable instructions, including firmware and/or software, to perform the management tasks.

BRIEF DESCRIPTION OF THE DRAWINGS

Some implementations of the present disclosure are described with respect to the following figures.

FIG. 5 is a flow diagram of a process according to some examples.

Figure 1:
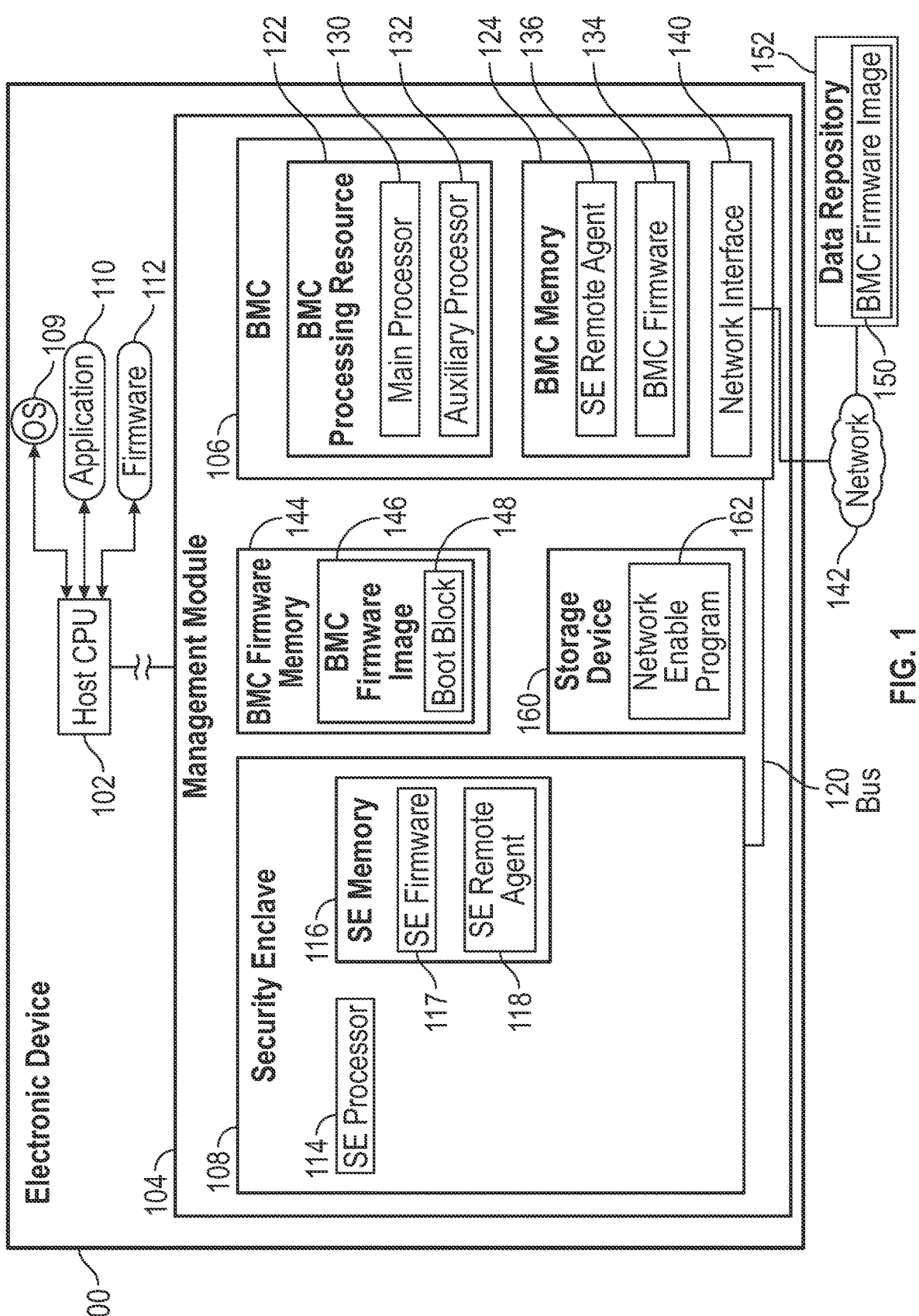
FIG. 1 is a block diagram of an arrangement including an electronic device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices can include security processors that perform certain security tasks of the electronic devices. In some cases, a security processor in an electronic device is responsible for loading machine-readable instructions into a management controller of the electronic device. For example, the security processor can load an initial portion of firmware (including machine-readable instructions) into the management controller, where the initial portion of firmware, when executed by the management controller, performs an initialization (including a boot process) of the management controller. This initial portion of firmware can be referred to as a boot block. In some examples, the boot block can include a boot loader that loads remaining portions of the firmware for execution by the management controller.

Before loading the initial portion of firmware into the management controller, the security processor can first check validity of a firmware image that includes the program code of the firmware. The check is to ensure that the firmware image has not been corrupted or compromised. More generally, the check is to ensure that the firmware image does not deviate from a target firmware image. If the security processor determines that the firmware image is not valid, then the security processor does not load the initial portion of firmware into the management controller, and further, the security processor may not allow the management controller to be released from a reset state. As a result, the management controller is unable to run and thus is unusable. The management controller being unavailable can prevent the electronic device from operating, which renders the electronic device inaccessible to users and may disrupt operations of a computing environment.

Additionally, capabilities of a security processor are generally limited to lower the cost of the security processor. For example, the security processor does not have a network interface to allow the security processor to communicate over a network. As another example, the processing capacity of the security processor is relatively low, which may prevent the security processor from performing certain tasks or may cause the security processor to perform some tasks very slowly.

In accordance with some implementations of the present disclosure, an electronic device includes a security processor that is able to leverage resources of a management controller to perform certain functions. Performing the functions using the resources of the management controller may enable the security processor to perform the functions that the security processor otherwise would not be able to perform. The security processor can load an agent to the management controller. The agent, when executed on the management controller, allows the security processor to employ the resources of the management controller, including, as examples, any or some combination of the following: a network interface of the management controller, a processing resource of the management controller, or any other resource. By being able to leverage the resources of the management controller, the security processor is able to perform any or some combination of the following functions: retrieve, over a network using the network interface of the management controller, a valid firmware image for the management controller if the security processor determines that an existing firmware image is invalid; perform computations such as measurements or monitoring operations of the management controller using the processing resource of the management controller; or other functions. In the foregoing examples, a resource of the management controller that can be leveraged includes the network interface of the management controller that is used by the security processor to retrieve the valid firmware image. Another resource of the management controller that can be leveraged by the security processor is the management controller's processing resource that can be used by the security processor to compute measurements of information of the management controller, or to monitor operations of the management controller.

A "security processor" refers to a processor that performs various security-related functions, including any or some combination of the following: validating machine-readable instructions executed on a hardware component; loading machine-readable instructions onto a hardware component; generating and/or maintaining keys related to cryptographic operations, such as encryption keys to encrypt information or private keys for signing information; maintaining security certificates used to authenticate an identity of an entity such as a user, a program, a website, an organization, a device, a program, or any other type of entity; performing root of trust operations (including measuring information such as machine-readable instructions or other information, performing signature verification, performing decryption, performing attestation, etc.); generating random numbers; or other security tasks.

FIG. 1 is a block diagram of an electronic device 100 that includes a host central processing unit (CPU) 102 and a management module 104. Examples of the electronic device 100 can include any or some combination of the following: a computer (e.g., a desktop computer, a notebook computer, a tablet computer, a server computer, or another type of computer), a smartphone, a communication node (e.g., a switch, a router, a gateway, or another type of device that supports communications), a storage system, a game appliance, an Internet of Things (IoT) device, a household appliance, a vehicle, or any other type of electronic device.

The host CPU 102 can include one or more processors, which form a processing resource of the electronic device 100. The host CPU 102 executes primary machine-readable instructions such as an operating system (OS) 109, an application program 110, system firmware (e.g., Basic Input/Output System (BIOS) code or Universal Extensible Firmware Interface (UEFI) code) 112, or other software or firmware. A processor can include a microprocessor, a core of a multi-core microprocessor, a microcontroller, a programmable integrated circuit, a programmable gate array, or another hardware processing circuit.

In further examples, the electronic device 100 may not execute an OS or an application program, in which case the OS 109 and the application program 110 are omitted.

The management module 104 includes a baseboard management controller (BMC) 106 and a security enclave 108. The BMC 106 is an example of a management controller that performs various management tasks of the electronic device 100. The host CPU 102 may be coupled to the BMC 106, such as through an input/output (I/O) bridge (not shown), which is a device that interconnects different components.

The management module 104 can be implemented with an integrated circuit chip, with a circuit board, or with an arrangement of discrete electronic components. Although reference is made to a BMC in some examples, other types of management controllers can be used in other examples. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The BMC 106 is coupled over a bus 120 to the security enclave 108. The bus 120 can refer to any type of communication link over which electronic components are able to communicate, such as a memory bus, a storage bus, a network, or any other type of link (whether wired or wireless).

The security enclave 108 (also referred to as a security boundary or a security perimeter) includes a subsystem of the management module 104 for which access into and out of the subsystem is more tightly controlled than access of other subsystems of the management module 104. For example, the security enclave 108 is fully disposed inside a cryptographic boundary. A "cryptographic boundary" can refer to a continuous boundary, or perimeter, which contains the logical and physical components of a cryptographic subsystem, such as components of the security enclave 108. The security enclave 108, in accordance with some examples, is isolated from components outside the security enclave 108. The cryptographic boundary is defined using a secure access mechanism such as by using encryption or another type of access control to protect components in the security enclave 108 from unauthorized access by components outside the security enclave 108.

The security enclave 108 includes a security enclave (SE) processor 114 that can perform various security-related functions of the management module 104, including any or some combination of those security-related functions listed above for the security processor.

The security enclave 108 further includes an SE memory 116, which can be implemented using any arrangement of storage elements, such as register(s), a dynamic random access memory (DRAM) device, a static random access memory (SRAM) device, a flash memory device, or any other type of memory device. A "register" refers to a small storage (e.g., smaller in size than a memory), which can be implemented using latches or other types of storage elements.

The SE memory 116 can store program code to be executed by the SE processor 114. The program code may include SE firmware 117, for example. More generally, the program code in the SE memory 116 includes machine-readable instructions for execution by the SE processor 114 within the security enclave 108 for performing the tasks of the security enclave 108.

In the ensuing discussion, reference is made to the SE processor 114 performing various tasks. Note that such tasks may be performed when the SE firmware 117 or other program code is executed on the SE processor 114.

In accordance with some examples of the present disclosure, the SE memory 116 further stores an SE remote agent 118 that is to be provided to the BMC 106 for execution by the BMC 106. Whereas the SE firmware 117 is to be executed by the SE processor 114, the SE remote agent 118 is to be executed by a BMC processing resource 122 in the BMC 106. The BMC processing resource 122 is separate and distinct from the SE processor 114. Both the BMC processing resource 122 and the SE processor 114 are separate and distinct from the host CPU 102.

The SE remote agent 118 can be provided from the security enclave 108 to the BMC 106, such as over the bus 120. The SE remote agent 118 provided to the BMC 106 can be stored in a BMC memory 124 as an SE remote agent 126. The SE remote agent 126 is executable by the BMC processing resource 122.

The SE remote agent 126 is a subordinate program that would perform any actions requested of the SE remote agent 126 by the SE processor 114. The SE remote agent 126 when executed by the BMC processing resource 122 allows the SE processor 114 to make use of resources of the BMC 106.

In some examples, the BMC processing resource 122 includes a main processor 130 and an auxiliary processor 132. The main processor 130 can be used to execute BMC firmware 134 stored in the BMC memory 124. The auxiliary processor 132 can be used to execute other program code of the BMC 106.

In some examples of the present disclosure, the SE remote agent 126 can be executed by the auxiliary processor 132 of the BMC processing resource 122. In other examples, the BMC processing resource 122 includes just the main processor 130 (and not the auxiliary processor 132), in which case the SE remote agent 126 would be executed by the main processor 130. More generally, the BMC processing resource 122 includes one or more processors that can be used to execute various program code of the BMC 106, including the BMC firmware 134, the SE remote agent 126, and other program code.

The BMC 106 further includes a network interface 140 to allow the BMC 106 to perform communications over a network 142 (e.g., a management network) with an entity that is external of the electronic device 100. The network 142 may include a local area network (LAN), a wide area network (WAN), the Internet, or any other type of network.

The network interface 140 can include a transceiver to transmit and receive signals, as well as any protocol layers to manage communications according to respective communication protocols.

The management module 104 includes a BMC firmware memory 144 that can store a BMC firmware image 146 containing machine-readable instructions of BMC firmware to be executed by the BMC 106. In some examples, the BMC firmware memory 144 can be implemented using a read-only memory (ROM), such as an erasable and programmable read-only memory (e.g., EPROM) or an electrically erasable and programmable re-only memory (i.e., EEPROM). In other examples, the BMC firmware memory 144 can be implemented using a different type of memory device.

The BMC firmware image 146 includes a boot block 148, which includes a loader that when executed at the BMC 106 causes loading of the remaining portion of the BMC firmware 134 from the BMC firmware image 146.

Before the SE processor 114 loads the boot block 148 onto the BMC 106, the SE processor 114 can check the BMC firmware image 146 to determine whether the BMC firmware image 146 is valid. For example, the SE processor 114 can calculate a cryptographic hash value based on applying a cryptographic hash function on the BMC firmware image 146 (or a portion of the BMC firmware image 146). Examples of cryptographic hash functions include a secure hash algorithm (SHA) cryptographic function or another type of cryptographic hash function.

To determine whether the BMC firmware image 146 is valid, the SE processor 114 can compare the cryptographic hash value derived by applying the cryptographic hash function on the BMC firmware image 146, to a stored cryptographic hash value (e.g., stored in the SE memory 116). If the cryptographic hash values match, then that indicates that the BMC firmware image 146 is valid. If the cryptographic hash values do not match, then that indicates that the BMC firmware image 146 is invalid, such as due to being corrupted or compromised. In some cases, corruption of the BMC firmware image 146 may be caused by data errors or other faults. In other cases, the BMC firmware image 146 may be compromised by malware. In some examples, to protect the stored cryptographic hash value from unauthorized access, the stored cryptographic hash value may be stored in an encrypted form. The encrypted form of the stored cryptographic hash value can be decrypted to compare to the cryptographic hash value based on the BMC firmware image 146.

In accordance with some implementations of the present disclosure, if the SE processor 114 determines that the BMC firmware image 146 is invalid, the SE processor 114 does not load the boot block 148 to the BMC 106. Rather, the SE processor 114 can use the SE remote agent 126 executed at the BMC 106 to enable the network interface 140 of the BMC 106. Once the network interface 140 of the BMC 106 is enabled, the SE processor 114 can retrieve, over the network 142, a BMC firmware image 150 from a data repository 152. The BMC firmware image 150 in the data repository 152 may be a known good copy of BMC firmware image. A known good copy of the BMC firmware image refers to a BMC firmware image that was previously checked to ensure that firmware image is valid. The BMC firmware image 150 is a replacement BMC firmware image 150 for the BMC firmware image 146 in the BMC firmware memory 144.

In some examples, even though the network interface 140 is enabled by the SE remote agent 126, a remaining portion of the BMC 106 may remain disabled, e.g., maintained in a reset state. The disabled remaining portion of the BMC 106 may include the BMC processing resource 122, for example.

The SE processor 114 can replace the corrupted or compromised BMC firmware image 146 with the retrieved BMC firmware image 150 in the BMC firmware memory. The SE processor 114 can then load a boot block of the BMC firmware image 150 to the BMC 106, which when executed at the BMC 106 causes loading of the BMC firmware 134 from the BMC firmware image 150.

The network interface 140 is an example of a resource of the BMC 106 that can be leveraged by the SE processor 114 using the SE remote agent 126. In other examples, the SE processor 114 can use the SE remote agent 126 to leverage other resources of the BMC 106, such as the BMC processing resource 122. For example, the BMC processing resource 122 can be used by the SE processor 114 to make measurements of the BMC 106, or to monitor operations of the BMC 106 or the electronic device 100, or other functions.

A "measurement" of the BMC 106 refers to computing a value based on information in one or more components of the BMC 106, where a "component" of the BMC can refer to a hardware component or a component including machine-readable instructions. The value computed based on the information of the BMC 106 can be a cryptographic hash value derived by applying a cryptographic hash function on the information of the BMC 106. As a further example, the measurement can be of configuration information in the BMC 106, such as configuration information in various configuration registers or other parts of the BMC 106. Configuration information can refer to information that is used to configure the BMC 106 according to a target specification.

Figure 2:
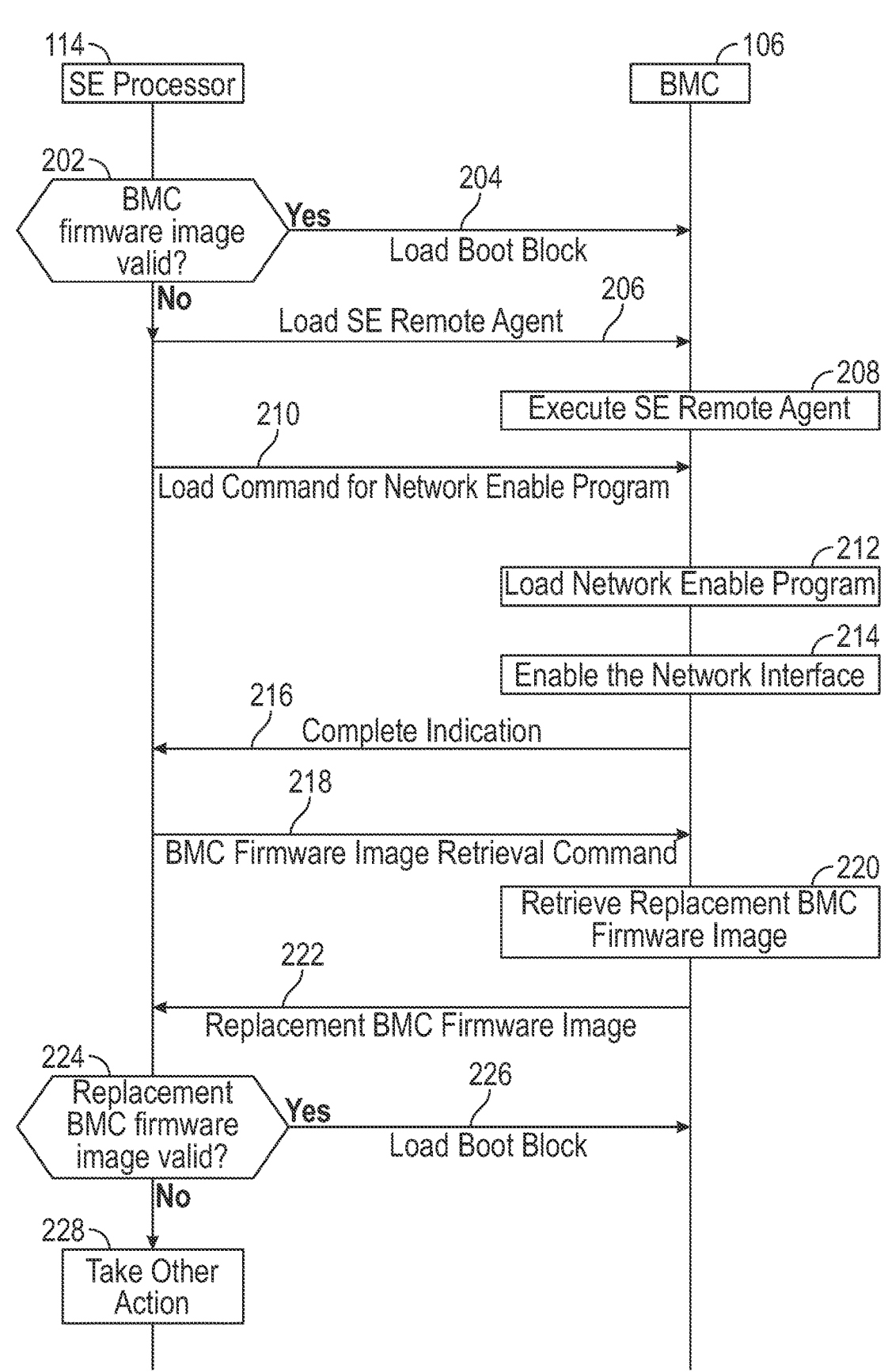
FIG. 2 is a flow diagram of a process involving a security processor and a management controller, according to some examples.

The ensuing discussion refers to FIG. 1 and FIG. 2. FIG. 2 is a flow diagram of a process involving the SE processor 114 and the BMC 106, according to some examples of the present disclosure. In different examples, the tasks of the process of FIG. 2 may be performed in a different order, some tasks may be omitted, and other tasks may be added.

During initialization of the electronic device 100, the SE processor 114 is responsible for loading the boot block 148 of the BMC firmware image 146 to the BMC 106. Before doing so, the SE processor 114 checks (at 202) the BMC firmware image 146 to determine whether the BMC firmware image 146 is valid. If the BMC firmware image 146 is valid, the SE processor 114 loads (at 204) the boot block 148 to the BMC 106, where the boot block 148 is executed by the BMC processing resource 122 (e.g., by the main processor 130 of the BMC processing resource 122 in examples where the BMC processing resource includes the main processor 130 and the auxiliary processor 132). The boot block 148 performs the initial boot phase of the BMC 106, and the boot block 148 includes a boot loader to load a remaining portion of the BMC firmware to the BMC 106.

However, if the SE processor 114 determines (at 202) that the BMC firmware image 146 is invalid, the SE processor 114 does not load the boot block 148 to the BMC 106. Instead, the SE processor 114 loads (at 206) the SE remote agent 118 to the BMC 106, which stores the SE remote agent 126 in the BMC memory 124. The SE remote agent 126 is executed (at 208) by the BMC processing resource 122, such as by the auxiliary processor 132 in examples where the BMC processing resource 122 includes the main processor 130 and the auxiliary processor 132.

Once the SE remote agent 126 is loaded and executed at the BMC 106, the SE processor 114 can issue (at 210) a load command to load a network enable program 162 from a storage device 160, which can be part of the management module 104 or part of the electronic device 100 outside the management module 104.

In response to the load command, the SE remote agent 126 loads (at 212) the network enable program 162 to the BMC 106, which causes execution of the network enable program 162 by the BMC processing resource 122. The network enable program 162 when executed at the BMC 106 enables (at 214) the network interface 140 for use by the SE processor 114. For example, the network enable program 162 can release the network interface 140 from reset so that the network interface 140 can start operation.

Once the network interface 140 is enabled, the SE remote agent 126 sends (at 216) a complete indication to the SE processor 114 for indicating that the load of the network enable program 162 has been completed, and that the network enable program 162 has been executed at the BMC 106.

In further examples, the SE processor 114 can perform a network interface test process to confirm that the network interface 140 of the BMC 106 has in fact been enabled. For example, the SE processor 114 can send, to the BMC 106, a ping indication (e.g., a ping message, a ping information element, or other indicator) that is to be sent to a remote resource for contacting the remote resource over a network (e.g., 142) through the network interface 140. If the network interface 140 is enabled, the SE processor 114 receives a response to the ping indication from the BMC 106. Based on receipt of the response to the ping indication, the SE processor 114 can confirm that the network interface 140 is enabled.

In response to the complete indication or otherwise confirming that the network interface 140 is enabled, the SE processor 114 can send (at 218) a BMC firmware image retrieval command to the SE remote agent 126 to cause the SE remote agent 126 to retrieve (at 220) the BMC firmware image 150 ("replacement BMC firmware image") from the data repository 152 over the network 142, using the enabled network interface 140. In some examples, the SE remote agent 126 can include location information regarding where the BMC firmware image 150 can be obtained. For example, the location information can include a uniform resource locator (URL), a uniform resource identifier, a memory address, or another type of location information.

The SE remote agent 126 transfers (at 222) the retrieved replacement BMC firmware image 150 from the BMC 106 to the security enclave 108. At the security enclave 108, the SE processor 114 can check (at 224) the replacement BMC firmware image 150 to determine whether the replacement BMC firmware image 150 is valid. If so, the SE processor 114 can load (at 226) a boot block of the replacement BMC firmware image 150 to the BMC 106, to start the boot process of the BMC 106. However, if the replacement BMC firmware image 150 is invalid, then the SE processor 114 does not load the boot block of the replacement BMC firmware image 150 to the BMC 106; instead, the SE processor 114 can take other action (at 228), such as sending an alert that the loading of BMC firmware has failed, or finding another source of a BMC firmware image.

The foregoing refers to an example in which the SE remote agent 126 when executed by the BMC processing resource 122 enables the network interface 140 for use by the SE processor 114. As noted above, in other examples, the SE remote agent 126 can also enable other resources of the BMC 106 for use by the SE processor 114.

Figure 3:
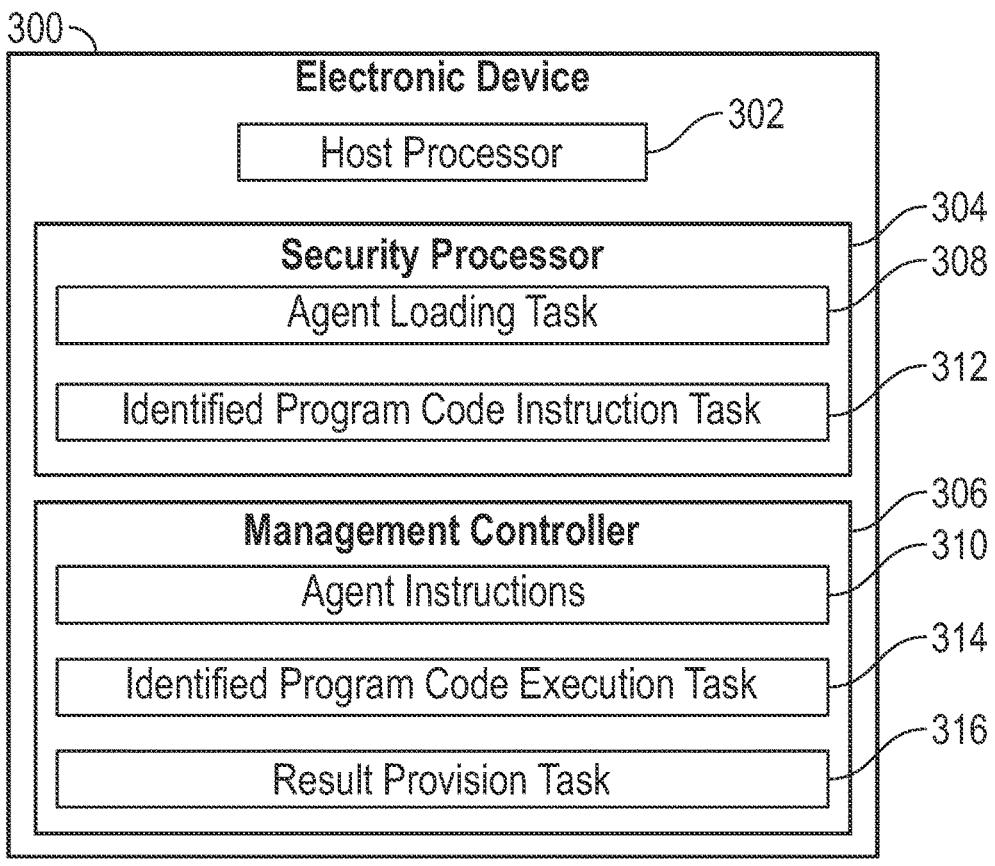
FIG. 3 is a block diagram of an electronic device according to some examples.

FIG. 3 is a block diagram of an electronic device 300. The electronic device 300 includes a host processor 302, such as the host CPU 102 of FIG. 1. The electronic device 300 further includes a security processor 304 separate from the host processor 302. The security processor 304 may be part of the security enclave 108 of FIG. 1, for example.

The electronic device 300 further includes a management controller 306 separate from the host processor 302. For example, the management controller 306 may be a BMC to perform management tasks of the electronic device 300.

The security processor 304 can perform various tasks. The tasks of the security processor 304 can include an agent loading task 308 to load agent instructions 310 associated with the security processor 304 to the management controller 306. The agent instructions 310 can include the SE remote agent 118 of FIG. 1, for example.

The tasks of the security processor 304 can further include an identified program code instruction task 312 to send, from the security processor 304 to the agent instructions 310 executing on the management controller 306, an indication to execute identified machine-readable instructions. In some examples, the identified machine-readable instructions include the network enable program 162 of FIG. 1.

The agent instructions 310 when executed on the management controller 306 cause the management controller 306 to perform various tasks. Based on the indication, the agent instructions 310 can cause the management controller 306 to perform an identified program code execution task 314 to execute the identified machine-readable instructions that employ a resource of the management controller 306. The resource may include the network interface 140 or the BMC processing resource 122 of FIG. 1, for example.

The agent instructions 310 can further cause the management controller 306 to perform a result provision task 316 that provides, from the management controller 306 to the security processor 304, a result of a process that employs the resource of the management controller 306. The process may include a firmware image retrieval process to retrieve a replacement firmware image (e.g., 150 in FIG. 1) for the management controller 306. Alternatively, the process may include a measurement process to measure the management controller 306, monitor the management controller 306 or the electronic device 300, or another process.

In some examples, the security processor 304 checks program code of the management controller 306 to determine a validity of the program code. The security processor 304 loads the agent instructions 310 to the management controller 306 based on the check indicating that the program code of the management controller 306 is invalid. In some examples, the program code includes firmware of the management controller 306.

In some examples, the resource of the management controller 306 includes a network interface of the management controller 306. The agent instructions 310 when executed on the management controller 306 cause the management controller 306 to execute the identified machine-readable instructions to enable the network interface of the management controller 306, and retrieves, using the enabled network interface, program code from a storage location over a network. In some examples, the result provided from the management controller 306 to the security processor 304 includes the retrieved program code.

In some examples, the security processor 304 instructs the agent instructions 310 to retrieve the program code from the storage location, by providing the agent instructions 310 with location information of the program code.

In some examples, the security processor 304 loads the retrieved program code to the management controller 306 to execute at the management controller 306.

In some examples, the security processor 304 checks the retrieved program code to determine a validity of the retrieved program code. The loading of the retrieved program code to the management controller 306 is performed responsive to the security processor 304 determining that the retrieved program code is valid.

In some examples, the loading of the retrieved program code to the management controller 306 causes replacement of a program code previously loaded in the management controller 306 with the retrieved program code.

In some examples, the security processor 304 sends, to the management controller 306, a ping indication that is to contact a remote resource over a network through the network interface of the management controller 306. The security processor 304 receives a response to the ping indication from the management controller 306, and confirms that the network interface is enabled based on receipt of the response to the ping indication.

In some examples, the resource of the management controller 306 includes a processing resource of the management controller 306. The identified machine-readable instructions are executed on the processing resource of the management controller 306.

In some examples, the execution of the identified machine-readable instructions on the processing resource of the management controller 306 causes a measurement of the management controller 306. The measurement of the management controller 306 includes a measurement of information (e.g., configuration information) in one or more components of the management controller.

In some examples, the management controller 306 includes a main processor and an auxiliary processor, and the agent instructions 310 are executable on the auxiliary processor.

Figure 4:
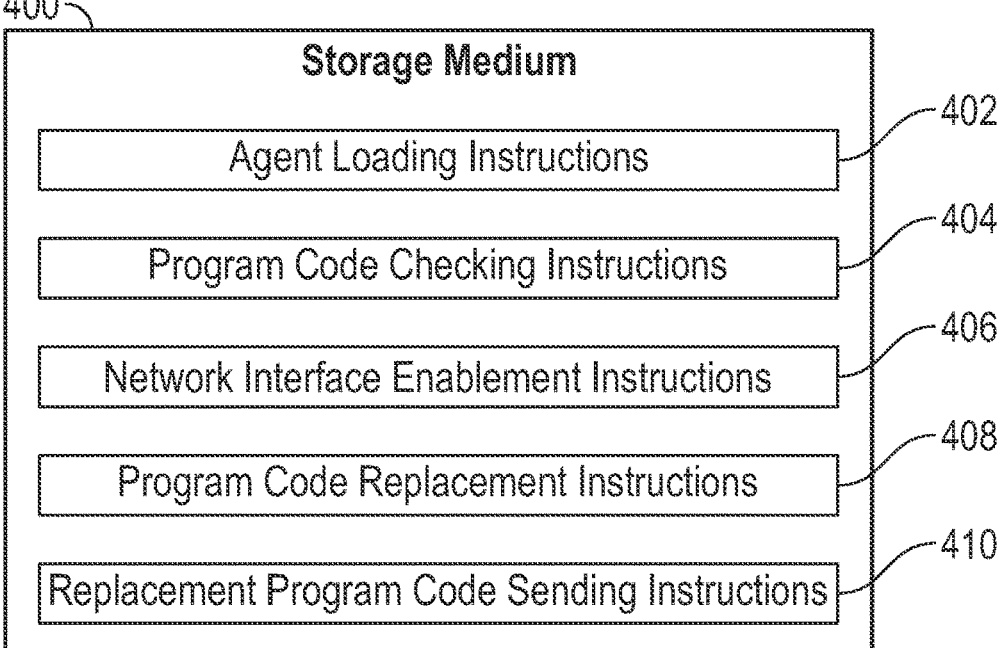
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a security processor in an electronic device to perform various tasks.

The machine-readable instructions include agent loading instructions 402 to load agent instructions associated with the security processor to a management controller, where the security processor and the management controller are separate from a host processor of the electronic device. The loading of the agent instructions to the management controller causes execution of the agent instructions at the management controller. The agent instructions are responsive to commands from the security processor to perform actions requested by the security processor.

The machine-readable instructions include program code checking instructions 404 to check a program code of the management controller in a memory. The program code to be checked includes software or firmware to be executed by the management controller.

The machine-readable instructions include network interface enablement instructions 406 to, based on determining that the program code of the management controller is invalid, instruct the agent instructions executed on the management controller to enable a network interface of the management controller, and retrieve a replacement program code through the enabled network interface.

The machine-readable instructions include program code replacement instructions 408 to replace the program code in the memory with the replacement program code. For example, corrupted or compromised program code in the memory can be replaced with the replacement program code.

The machine-readable instructions include replacement program code sending instructions 410 to send the replacement program code to the management controller for execution at the management controller. For example, if the replacement program code includes firmware of the management controller, the replacement program code sending instructions 410 can send a boot block of the firmware for execution at the management controller.

FIG. 5 is a flow diagram of a process 500 according to some examples. The process 500 includes loading (at 502) agent instructions from a security processor to a management controller, where the security processor performs security tasks of an electronic device, and the management controller performs management tasks of the electronic device. The agent instructions loaded can include the SE remote agent 118 of FIG. 1, for example.

The process 500 includes sending (at 504), from the security processor to the agent instructions executing on the management controller, an indication to execute identified machine-readable instructions that allow the security processor to leverage use of a resource of the management controller on behalf of the security processor. For example, the resource can include a network interface or another resource of the management controller.

The process 500 includes executing (at 506), at the management controller, a process that employs the resource of the management controller. For example, the process may include a replacement program code retrieval process to retrieve a replacement program code for the management controller. Alternatively, the process may include a measurement process to measure the management controller, monitor the management controller or the electronic device, or another process.

The process 500 includes sending (at 508), from the management controller to the security processor, a result of the process that employs the resource of the management controller.

A "BMC" (e.g., the BMC 106 of FIG. 1) can refer to a specialized service controller that monitors the physical state of an electronic device using sensors and communicates with a remote management system (that is remote from the electronic device) through an independent "out-of-band" connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the computer system to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a main processor, a memory, an input/output (I/O) device, etc.) of the electronic device.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a host processor;
   a security processor separate from the host processor;
   a management controller separate from the host processor, the management controller to perform management tasks of the electronic device; and
   a bus connecting the management controller and the security processor,
   the security processor to:
      send agent instructions associated with the security processor over the bus to the management controller, wherein the security processor is to leverage use of a resource of the management controller based on execution of the agent instructions on the management controller,
      send, from the security processor to the agent instructions executing on the management controller, an indication to execute identified machine-readable instructions,
   the agent instructions when executed on the management controller causing the management controller to:
      based on the indication, execute the identified machine-readable instructions that employ the resource of the management controller, and
      provide, from the management controller to the security processor, a result of a process that employs the resource of the management controller.

2. The electronic device of claim 1, wherein the security processor is to:
   check program code stored at the management controller to determine a validity of the program code, and
   send the agent instructions over the bus to the management controller based on the check indicating that the program code of the management controller is invalid.

3. The electronic device of claim 2, wherein the program code comprises firmware of the management controller, and wherein the security processor declines to load a boot block in the firmware to the management controller based on the check indicating that the program code of the management controller is invalid.

4. The electronic device of claim 2, wherein the resource of the management controller comprises a network interface of the management controller, and the security processor is to leverage use of the network interface based on execution of the agent instructions on the management controller, and wherein the agent instructions when executed on the management controller cause the management controller to:
   execute the identified machine-readable instructions to enable the network interface of the management controller, and
   retrieve, using the enabled network interface, program code from a storage location over a network,
   wherein the result provided from the management controller to the security processor comprises the retrieved program code.

5. The electronic device of claim 4, wherein the security processor is to instruct the agent instructions to retrieve the program code from the storage location, by providing the agent instructions with location information of the program code.

6. The electronic device of claim 4, wherein the security processor is to:
   load, over the bus, the retrieved program code to the management controller to execute at the management controller.

7. The electronic device of claim 6, wherein the security processor is to:
   check the retrieved program code to determine a validity of the retrieved program code,
   wherein the loading of the retrieved program code over the bus to the management controller is performed responsive to the security processor determining that the retrieved program code is valid.

8. The electronic device of claim 6, wherein the loading of the retrieved program code over the bus to the management controller causes replacement of the program code previously loaded in the management controller with the retrieved program code.

9. The electronic device of claim 4, wherein a remaining portion of the management controller remains disabled while the network interface is enabled.

10. The electronic device of claim 1, wherein the resource of the management controller comprises a network interface of the management controller, and wherein the agent instructions when executed on the management controller cause the management controller to:

execute the identified machine-readable instructions to enable the network interface of the management controller, and wherein the security processor is to:

send, to the management controller, a ping indication that is to be sent to a remote resource over a network through the network interface of the management controller, receive a response to the ping indication from the management controller, and confirm that the network interface is enabled based on receipt of the response to the ping indication.

11. The electronic device of claim 1, wherein the resource of the management controller comprises a processing resource of the management controller, and the security processor is to leverage use of the processing resource based on execution of the agent instructions on the management controller, and wherein the identified machine-readable instructions are executed on the processing resource of the management controller.

12. The electronic device of claim 11, wherein the execution of the identified machine-readable instructions on the processing resource of the management controller causes a measurement of the management controller.

13. The electronic device of claim 12, wherein the measurement of the management controller comprises a measurement of information in one or more components of the management controller.

14. The electronic device of claim 12, wherein the measurement of the management controller comprises a measurement of configuration information in the management controller.

15. A non-transitory machine-readable storage medium comprising instructions that upon execution cause a security processor in an electronic device to:

load agent instructions associated with the security processor to a management controller, wherein the security processor and the management controller are separate from a host processor of the electronic device;

check a program code of the management controller in a memory;

based on determining that the program code of the management controller is invalid, instruct the agent instructions executed on the management controller to enable a network interface of the management controller, and retrieve a replacement program code through the enabled network interface;

replace the program code in the memory with the replacement program code; and send the replacement program code to the management controller for execution at the management controller.

14

16. The non-transitory machine-readable storage medium of claim 15, wherein the replacement program code comprises firmware of the management controller, and the sending of the replacement program code to the management controller comprises sending a boot block of the firmware from the security processor over a bus to the management controller to initiate a boot process of the management controller.

17. The non-transitory machine-readable storage medium of claim 15, wherein the instructions upon execution cause the security processor to:

instruct the agent instructions executed on the management controller to measure information at the management controller; and receive, at the security processor, a result of the measurement over a bus from the management controller.

18. A method comprising:

sending, agent instructions from a security processor over a bus to a management controller, wherein the security processor performs security tasks of an electronic device, and the management controller performs management tasks of the electronic device, wherein the security processor and the management controller are separate from a host processor of the electronic device, and wherein the security processor is to leverage use of a resource of the management controller on behalf of the security processor based on execution of the agent instructions on the management controller;

sending, from the security processor to the agent instructions executing on the management controller, an indication to execute identified machine-readable instructions that allow the security processor to leverage the use of the resource of the management controller on behalf of the security processor;

executing, at the management controller, a process that employs the resource of the management controller; and sending, from the management controller to the security processor, a result of the process that employs the resource of the management controller.

19. The method of claim 18, wherein the identified machine-readable instructions when executed at the management controller enable a network interface of the management controller, and the process employs the enabled network interface.

20. The method of claim 19, comprising:

instructing, by the security processor, the agent instructions to retrieve a replacement program code using the enabled network interface;

receiving, by the security processor over the bus from the management controller, the replacement program code;

checking, by the security processor, a validity of the replacement program code; and causing execution of the replacement program code at the management controller based on determining that the replacement program code is valid.

\* \* \* \* \*